(12) United States Patent
Palmer et al.

(10) Patent No.: US 11,605,166 B2
(45) Date of Patent: Mar. 14, 2023

(54) GPU ACCELERATED IMAGE SEGMENTATION

(71) Applicant: Parsons Corporation, Centreville, VA (US)

(72) Inventors: Samantha Palmer, Centreville, VA (US); Joseph Payton, Centreville, VA (US)

(73) Assignee: PARSONS CORPORATION, Centreville, VA (US)

( * ) Notice: Subject to any disclaimer, the term of this patent is extended or adjusted under 35 U.S.C. 154(b) by 351 days.

(21) Appl. No.: 17/068,110

(22) Filed: Oct. 12, 2020

(65) Prior Publication Data
US 2021/0118142 A1  Apr. 22, 2021

Related U.S. Application Data

(60) Provisional application No. 62/915,741, filed on Oct. 16, 2019.

(51) Int. Cl.
*G06T 7/11* (2017.01)
*G06F 17/15* (2006.01)
*G06T 1/20* (2006.01)

(52) U.S. Cl.
CPC .............. *G06T 7/11* (2017.01); *G06F 17/15* (2013.01); *G06T 1/20* (2013.01)

(58) Field of Classification Search
CPC .............. G06T 7/11; G06T 1/20; G06F 17/15
USPC .......................................................... 382/173
See application file for complete search history.

(56) References Cited

U.S. PATENT DOCUMENTS

| | | |
|---|---|---|
| 5,365,592 A | 11/1994 | Horner et al. |
| 5,426,438 A | 6/1995 | Peavey et al. |
| 5,436,847 A | 7/1995 | Schroer et al. |
| 5,867,535 A | 2/1999 | Phillips et al. |

(Continued)

FOREIGN PATENT DOCUMENTS

| | | |
|---|---|---|
| CN | 201476875 | 5/2010 |
| CN | 101826889 | 9/2010 |

(Continued)

OTHER PUBLICATIONS

Wassie Dereje Assefa et al., "An Agile Multi-Node Multi-Antenna Wireless Channel Sounding System", IEEE Access, vol. 7, (Jan. 31, 2019), pp. 17503-17516.

(Continued)

*Primary Examiner* — Gabriel I Garcia
(74) *Attorney, Agent, or Firm* — Martensen IP; Michael C. Martensen (57) ABSTRACT

Data gathered from a continual data source is converted into an image and represented by a rectilinear grid defining a grid of pixels. Each pixel in each axis unit of one axis is examined in parallel using a graphic processor unit (GPU) to determine whether any pixels exceed a predefined threshold. Those pixels that exceed the threshold are identified as positive return pixels. Within each axis unit groups of positive return pixels are identified based on a first axis epsilon. Adjacent groups of positive return pixels are assembled by merging the axis units based on a second axis epsilon. Groups of positive return pixels grouped together according to the first axis epsilon and the second axis epsilon are classified and reported as a signal.

21 Claims, 7 Drawing Sheets

(56) References Cited

U.S. PATENT DOCUMENTS

| | | | |
|---|---|---|---|
| 6,078,736 | A | 6/2000 | Guccione |
| 6,539,438 | B1 | 3/2003 | Ledzius et al. |
| 6,771,803 | B1 * | 8/2004 | Turek .................. G06T 7/12 |
| | | | 382/173 |
| 6,874,145 | B1 | 3/2005 | Ye |
| 6,898,235 | B1 | 5/2005 | Carlin et al. |
| 7,210,121 | B2 | 4/2007 | Xia et al. |
| 7,317,761 | B2 | 1/2008 | Lozhkin |
| 7,320,062 | B2 | 1/2008 | Master et al. |
| 7,349,503 | B2 | 3/2008 | Husted et al. |
| 7,366,246 | B2 | 4/2008 | Walker et al. |
| 7,369,485 | B2 | 5/2008 | Halford et al. |
| 7,403,505 | B2 | 7/2008 | Yoon et al. |
| 7,430,257 | B1 | 9/2008 | Shattil |
| RE41,130 | E | 2/2010 | Fette et al. |
| 7,684,467 | B2 | 3/2010 | Li et al. |
| 7,929,937 | B2 | 4/2011 | Koivunen et al. |
| 7,937,601 | B2 | 5/2011 | Bakker et al. |
| 7,987,151 | B2 | 7/2011 | Schott et al. |
| 7,987,432 | B1 | 7/2011 | Grechishkin et al. |
| 8,086,836 | B2 | 12/2011 | Chong et al. |
| 8,364,946 | B2 | 1/2013 | Ishebabi |
| 8,412,111 | B2 | 4/2013 | Talwar et al. |
| 8,615,206 | B2 | 12/2013 | Meng |
| 8,677,378 | B2 | 3/2014 | Murotake et al. |
| 8,763,004 | B1 | 6/2014 | Callahan, III |
| 8,850,411 | B2 | 9/2014 | Kelem et al. |
| 9,663,659 | B1 | 5/2017 | Harlow |
| 2003/0011514 | A1 | 1/2003 | Krichofer et al. |
| 2004/0093595 | A1 | 5/2004 | Bilange |
| 2005/0120346 | A1 | 6/2005 | Sprigg |
| 2005/0125513 | A1 | 6/2005 | Sin-Ling Lam et al. |
| 2006/0195840 | A1 | 8/2006 | Sundarrajan et al. |
| 2006/0218549 | A1 | 9/2006 | Hsu et al. |
| 2006/0248445 | A1 | 11/2006 | Rogerson et al. |
| 2007/0256073 | A1 | 11/2007 | Troung et al. |
| 2008/0040507 | A1 | 2/2008 | Hsu et al. |
| 2008/0134143 | A1 | 6/2008 | Hoerentrup et al. |
| 2008/0147705 | A1 | 6/2008 | Bansal et al. |
| 2008/0198948 | A1 | 8/2008 | Tang |
| 2008/0318544 | A1 | 12/2008 | Wang et al. |
| 2009/0031396 | A1 | 1/2009 | Jung et al. |
| 2009/0119773 | A1 | 5/2009 | D'Amore |
| 2009/0129493 | A1 | 5/2009 | Zhang et al. |
| 2009/0215390 | A1 | 8/2009 | Ku et al. |
| 2009/0279626 | A1 | 11/2009 | Wang |
| 2009/0287894 | A1 | 11/2009 | Renno |
| 2009/0290552 | A1 | 11/2009 | Bertorelle |
| 2009/0307540 | A1 | 12/2009 | Razazian et al. |
| 2009/0313620 | A1 | 12/2009 | Sedukhin et al. |
| 2010/0086074 | A1 | 4/2010 | Chen et al. |
| 2010/0138501 | A1 | 6/2010 | Clinton et al. |
| 2010/0142643 | A1 | 6/2010 | Ueda et al. |
| 2010/0202574 | A1 | 8/2010 | Chen et al. |
| 2010/0205274 | A1 | 8/2010 | Gharabally et al. |
| 2010/0226454 | A1 | 9/2010 | Bliss et al. |
| 2010/0235261 | A1 | 9/2010 | Lloyd et al. |
| 2010/0306773 | A1 | 12/2010 | Lee et al. |
| 2010/0319051 | A1 | 12/2010 | Bafna et al. |
| 2011/0296412 | A1 | 12/2011 | Banga et al. |
| 2012/0023194 | A1 | 1/2012 | Ruiz-Velasco et al. |
| 2012/0030672 | A1 | 2/2012 | Zygmuntowicz et al. |
| 2012/0036552 | A1 | 2/2012 | Dare et al. |
| 2012/0054184 | A1 | 3/2012 | Masud et al. |
| 2012/0066679 | A1 | 3/2012 | Pappas et al. |
| 2012/0151479 | A1 | 6/2012 | Kothari |
| 2012/0303695 | A1 | 11/2012 | Michel et al. |
| 2013/0061222 | A1 | 3/2013 | Hwang et al. |
| 2013/0067089 | A1 | 3/2013 | Synytskyy et al. |
| 2013/0102254 | A1 | 4/2013 | Cyzs et al. |
| 2013/0111328 | A1 | 5/2013 | Khanna et al. |
| 2013/0167135 | A1 | 6/2013 | Neumann et al. |
| 2013/0181867 | A1 | 7/2013 | Sturdivant et al. |
| 2013/0191495 | A1 | 7/2013 | Almstrand et al. |
| 2013/0198734 | A1 | 8/2013 | Biswas et al. |
| 2013/0212559 | A1 | 8/2013 | Lehtimaki et al. |
| 2013/0227565 | A1 | 8/2013 | Lee et al. |
| 2013/0283400 | A1 | 10/2013 | Schneider et al. |
| 2013/0308940 | A1 | 11/2013 | Kpodzo et al. |
| 2013/0326499 | A1 | 12/2013 | Mowatt et al. |
| 2013/0332991 | A1 | 12/2013 | Rivera |
| 2013/0346965 | A1 | 12/2013 | Conlan et al. |
| 2014/0007048 | A1 | 1/2014 | Qureshi et al. |
| 2014/0007122 | A1 | 1/2014 | Udeshi et al. |
| 2014/0079235 | A1 | 3/2014 | Lyons |
| 2014/0269374 | A1 | 9/2014 | Abdelmonem et al. |
| 2015/0270917 | A1 | 9/2015 | Roman et al. |
| 2016/0267356 | A1 * | 9/2016 | Hashiguchi .......... G06V 10/762 |
| 2017/0011625 | A1 | 1/2017 | Stelzig et al. |
| 2017/0094527 | A1 | 3/2017 | Shattil et al. |
| 2018/0014217 | A1 | 1/2018 | Kleinbeck et al. |
| 2019/0346533 | A1 | 11/2019 | Robinson et al. |
| 2020/0162559 | A1 | 5/2020 | Sustaeta et al. |
| 2020/0242516 | A1 | 7/2020 | Dhingra et al. |
| 2021/0056363 | A1 * | 2/2021 | Song .................... G06T 7/11 |

FOREIGN PATENT DOCUMENTS

| | | |
|---|---|---|
| CN | 202794534 | 3/2013 |
| CN | 102158242 | 7/2013 |
| CN | 110007991 A | 7/2019 |
| EP | 3065324 A1 | 9/2016 |
| GB | 2344729 A | 6/2000 |
| KR | 20020016434 | 3/2002 |

OTHER PUBLICATIONS

Stanciu Valentin et al., "Data Collection for Spectrum Sensing Algorithms Based on USRP", 2014 10th International Conferfence on Communications (COMM), IEE, (May 29, 2014), pp. 1-4.

Patent Cooperation Treaty Application No. PCT/US2021/014161, International Search Report and Written Opinion, Applicant Parsons Corporation, dated May 10, 2021.

Patent Cooperation Treaty Application No. PCT/US2021/027640, International Search Report and Written Opinion, Applicant Parsons Corporation, dated Jul. 28, 2021.

Patent Cooperation Treaty Application No. PCT/US2021/026130, International Search Report and Written Opinion, Applicant Parsons Corporation, dated Jun. 18, 2021.

Axell, Erik, et al., "Optimal and Sub-Optimal Spectrum Sensing of OFDM Signals in Known and Unknown Noise Variance." IEEE Journal on Selected Areas in Communications, vol. 29, No. 2, Feb. 2011, pp. 290-304.

Bokharaiee, Simin, "Blind Spectrum Sensing for OFDM-Based Cognitive Radio Systems." IEEE Transactions on Vehicular Technology, vol. 60, No. 3, Mar. 2011, pp. 858-871.

Chen, Hou-Shin, et al., "Spectrum Sensing for OFDM Systems Employing Pilot Tones," IEEE Transactions on Wireless Communications, vol. 8, No. 12, Dec. 2009, pp. 5862-5870.

Rui, Yun, "Frequency Domain Discrete Fourier Transform Spread Generalized Multi-Carrier System and Its Performance Analysis," Computer Communications 32 (2009), pp. 456-464.

Ehringer, "The Dalvik Virtual Machine Architecture", 8 pages, (Mar. 2010).

Li, et al., "XVM: A Bridge Between XML Data and Its Behavior", pp. 155-163, (May 17-22, 2004).

Slade, et al., "Reconfigurable Computing Application Frameworks," Brigham Young University, 10 pages (2003).

Boano, et al., "Controllable Radio Interference for Experimental and Testing Purposes in Wireless Sensor Networks," www.soda.swedish-ict.se, 8 pages (Apr. 20, 2015).

SPIRENT Communications of Eatontown, L.P., "Spirent Communications TAS 4600A Noise and Interference Emulator Operations Manual," 168 pages (2001).

ITU, "Radio Regulations of the International Telecommunication Union Radiocommunication Sector (ITU-R) (2012 Ed.)", 432 pages (2012).

Al-Khateeb et al. "Recurring and Novel Class Detection Using Class-Based Ensemble for Evolving Data Stream", IEEE Transac- (56) References Cited

OTHER PUBLICATIONS tions on Knowlede and Data Engineering, IEEE Service Center, Los Alamitos, CA, US, vol. 28, No. 10, Oct. 1, 2016, pp. 2752-2764.
Patent Cooperation Treaty Application No. PCT/US2020/046808, International Search Report and Written Opinion, Applicant Parsons Corporation, dated Nov. 18, 2020.
Patent Cooperation Treaty Application No. PCT/US2020/055369, International Search Report and Written Opinion, Applicant Parsons Corporation, dated Feb. 5, 2021.
Mankun, Xu, et al. "A New Time-Frequency Spectrogram Analysis of FH Signals by Image Enhancement and Mathematical Morphology", Image and Graphics, 2007, ICIG 2007, Fourth International Conference on, IEEE, Piscataway, NJ, USA Aug. 1, 2007, pp. 610-615.
Simstad, Erik, et al. "Medical Image Segmentation on GPUs—A Comprehensive Review", Medical Image Analysis, vol. 20, No. 1, Feb. 1, 2015, pp. 1-18.
Chu-Carrol, Jennifer, et al. "A Multi-Strategy and Multi-Source Approach to Question Answering", Jan. 1, 2006, URL: https://www.egr.msu.edu/~jchai/QAPapers/ibm.prager.pdf, pp. 1-8.
Samadi, Abderrazzak, et al. "A Syntactic and Semantic Multi-Agent Based Question Answering System for Collaborative E-Learning", 2018 4th International Converence on Optimization and Applications (ICOA), IEEE, Apr. 26, 2018, pp. 1-4.
Patent Cooperation Treaty Application No. PCT/US2020/055370, International Search Report and Written Opinion, Applicant Parsons Corporation, dated Mar. 12, 2021.

\* cited by examiner

GPU ACCELERATED IMAGE SEGMENTATION

RELATED APPLICATION

The present application relates to and claims the benefit of priority to United States Provisional Patent Application no. 62/915,741 filed 16 Oct. 2019 which is hereby incorporated by reference in its entirety for all purposes as if fully set forth herein.

BACKGROUND OF THE INVENTION

Field of the Invention

Embodiments of the present invention relate, in general, to signal detection and more particularly to use of accelerated image segmentation to detect signals.

Relevant Background

Signal intelligence begins with signal detection and thus a need exists to quickly and accurately detect signals residing in a spectrum of interest. Typically, most solutions solve signal detection by building a device to best suit the kinds of signals the operator is seeking to observe. Such a process is inherently inefficient. Signals intelligence (SIGINT) is intelligence-gathering by interception of signals, whether communications between people or from electronic signals not directly used in communication. Accordingly, the first step in SIGINT is signal detection.

Frequency-agile signals are particularly problematic as the signals are designed to be complex and difficult to detect. In some instances, frequency-agile systems can reach up to 80,000 hops per second and transmitted in such a way to appear as occasional noise. Frequency agility is the ability of a system to quickly shift its operating frequency to account for atmospheric effects, jamming, mutual interference with friendly sources and the like, or to simply make it more difficult to locate the broadcaster through standard direction finding. The term can also be applied to other fields, including lasers or traditional radio transceivers using frequency-division multiplexing which remains closely associated with RADAR. Frequency-agile systems also use the more generic term "frequency hopping".

Frequency-agile systems are widely used. Cell phone, radar, and remote-control systems all employ frequency agility to minimize interference. The reason that several cell phones can be used at the same time in the same location is due to the use of frequency hopping. When the user wishes to place a call, the cell phone uses a negotiation process to find unused frequencies among the many that are available within its operational area. This allows users to join and leave particular cell towers on-the-fly, their frequencies being given up to other users.

Frequency agile radars can offer the same advantages. In the case of several aircraft having radar capabilities operating in the same location, the radars can select frequencies that are not being used in order to avoid interference. This is not as simple as the case of a cell phone, however, because ideally the radars would change their operating frequencies with every pulse. The algorithms for selecting a set of frequencies for the next pulse cannot be truly random if one wants to avoid all interference with similar systems, but a less-than-random system is subject to ELINT methods to determine the pattern. Frequency agility is also used in weather radars to allow them to strongly reflect off rain, or alternately, to see through it. By switching the frequencies back and forth, a composite image of the weather can be built up.

A need therefore exists to effectively and efficiently detect a signal from a continual source of data especially frequency agile signals. These and other deficiencies of the prior art are addressed by one or more embodiments of the present invention. Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

Signal detection using Graphic Processing Unit (GPU) accelerated image segmentation is hereafter described by way of example. A GPU is a specialized electronic circuit designed to rapidly manipulate and alter memory to accelerate the creation of images in a frame buffer intended for output to a display device. GPUs are used in embedded systems, mobile phones, personal computers, workstations, and game consoles. The present invention accelerates GPU processing using segment parallelization and merger to quickly and efficiently detect signals during a select time interval.

In one embodiment of the present invention, a method for GPU accelerated image segmentation can be implemented by a computer coupled to a continual data source wherein the computer includes a central graphics processor unit. The graphics processor, along with the central processing unit, can be configured to execute instructions to retrieve an image of data including a plurality of pixels wherein the pixels are arranged in a rectilinear grid. The grid includes a first axis and a second axis wherein each axis of the grid is associated with a plurality of axis units.

The method continues by examining each pixel within each axis unit along one axis. Responsive to a pixel power level (or similar value) exceeding a threshold, the method identifies the pixel as a positive return pixel. Each axis unit is examined in the same manner in parallel by the graphic processor unit.

Grouping a block of positive return pixels by merging is the next step in the method wherein a resulting block of positive return pixels is designated as a signal. The grouping of positive return pixels in an axis unit is based on a first axis epsilon value designating a maximum number of non-positive return adjacent pixels. Grouping includes iteratively merging each axis unit with its adjacent axis unit. In that instance the grouping of positive return pixels of each merged axis unit is based on a second axis epsilon value designating a maximum number of non-positive return adjacent pixels.

Another aspect of the present invention is selecting a time interval of data collected from the one or more continual sources of data and converting the time interval of data to the image using Fast Fourier Transforms. In one case the one or more continual sources of data can include a stream of radio frequency data.

In other embodiments, the present invention can be implemented as a system for accelerated image segmentation having a continual source of data, a computer communicatively coupled to the continual source of data wherein the computer includes a graphic processor unit, and a non-transitory storage medium configured to store a series of instructions embodied as software. The instructions direct the processors of the computer to execute the steps above.

In another embodiment of the present invention, a non-transitory computer-readable storage medium tangibly embodies a program of instructions executable by a machine having a graphic processor unit. The instruction comprises a plurality of program codes for accelerated line segmentation including program code for retrieving an image of data including a plurality of pixels wherein the pixels are arranged in a rectilinear grid having a first axis and a second axis and wherein each axis of the grid is associated with a plurality of axis units. The instructions further include program code for examining each pixel within each axis unit along one axis, wherein responsive to a pixel power level exceeding a threshold, the code identifies the pixel as a positive return pixel. Each axis unit is examined in parallel by the graphic processor unit; and program code for grouping a block of positive return pixels wherein each block of positive return pixels is designated as a signal. The grouping of positive return pixels in an axis unit is based on a first axis epsilon value designating a maximum number of non-positive return adjacent pixels.

The program of instruction for grouping also iteratively merges each axis unit with its adjacent unit. This grouping of positive return pixels of each merged axis unit is based on a second axis epsilon value designating a maximum number of non-positive return adjacent pixels.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

The Figures depict embodiments of the present invention for purposes of illustration only. Like numbers refer to like elements throughout. In the figures, the sizes of certain lines, layers, components, elements or features may be exaggerated for clarity. One skilled in the art will readily recognize from the following discussion that alternative embodiments of the structures and methods illustrated herein may be employed without departing from the principles of the invention described herein.

DESCRIPTION OF THE INVENTION

GPU accelerated image segmentation quickly and computationally efficiently detects signals in a select time interval of collected data. As data is gathered from a continual data source a snapshot of the data covering a select time interval is converted into an image represented by a rectilinear grid. The grid includes a first and second axis, with each axis having a plurality of axis units. The units define a grid of pixels.

According to one embodiment of the present invention, each pixel in each axis unit of one axis is examined in parallel using a graphic processor unit (GPU) to determine whether any pixels exceed a predefined power threshold. Those pixels that exceed the threshold are identified as positive return pixels. The invention continues by grouping within each axis unit groups of positive return pixels based on a first axis epsilon. Adjacent groups of positive return pixels are assembled by merging the axis units based on a second axis epsilon. Positive return pixels grouped together according to the first axis epsilon and the second axis epsilon are classified and reported as a signal.

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The term "Streaming Data" is understood to mean data that is continuously generated by different sources. Such data is normally processed incrementally without having access to all of the data. In addition, it should be considered that concept drift may happen in the data which means that the properties of the stream may change over time. Streaming Data is data, which is typically sent in data records simultaneously, and in small sizes (order of Kilobytes). Streaming data includes a wide variety of data such as log files generated by customers using your mobile or web applications, ecommerce purchases, in-game player activity, information from social networks, financial trading floors, or geospatial services, and telemetry from connected devices or instrumentation in data centers.

A Fast Fourie Transform (FFT) is understood to mean a Fourier analysis of a periodic function referring to the extraction of the series of sines and cosines which when superimposed will reproduce the function. This analysis can be expressed as a Fourier series. The Fast Fourier Transform is a mathematical method for transforming a function of time into a function of frequency and, in reverse, transforming a function of frequency into a function of time. Sometimes it is described as transforming from the time domain to the frequency domain and vice versa. It is very useful for analysis of time-dependent phenomena.

The term PIXEL is understood to mean a physical point in a raster image, or the smallest addressable element in an all points addressable display device or in a grid; it is the smallest controllable element of a picture. A pixel is generally thought of as the smallest single component of a digital image.

The term Graphic Processor Unit (GPU) is meant to mean a specialized, electronic circuit designed to rapidly manipulate and alter memory to accelerate the creation of images in a frame buffer intended for output to a display device. GPUs may execute multiple threads in parallel and are well suited for high-throughputs operations.

By the term Parallel Processing is meant a method in computing of running two or more processing threads to handle separate parts of an overall task. Breaking up different parts of a task among multiple threads will help reduce the amount of time to run a program. In digital signal processing (DSP), parallel processing is a technique duplicating function units to operate different tasks (signals) simultaneously.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

Included in the description are flowcharts depicting examples of the methodology which may be used GPU accelerated image segmentation. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve the manipulation of information elements. Typically, but not necessarily, such elements may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," "words", or the like. These specific words, however, are merely convenient labels and are to be associated with appropriate information elements.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

From a streaming source of data, one embodiment of the present invention, samples a select time interval of data and converts the data into an image represented as rectilinear grid. The grid, having a first axis and a second axis is divided into a plurality of axis units thereby defining a grid of pixels forming the image. Each pixel within each axis unit of one axis is examined to determine whether it exceeds a predefined power threshold. Those pixels that exceed the threshold are defined as a positive return pixel. Those positive return pixels within a singular axis unit that are in proximity of other positive return pixels based on a first axis epsilon are grouped together. The present invention conducts this axis unit analysis in parallel using the processing power of the GPU.

Groups of positive return pixels identified in each axis unit are thereafter merged together based on a second axis epsilon. The combined or assembled groups of positive return pixels represent a signal which is thereafter reported.

The process of the present invention begins with streaming data or, said differently, a continual source of data. Streaming data flows from a data source and includes sensors, for example, transportation vehicles, industrial equipment, and farm machinery. Tracking changes in the stock market in real time, computed value-at-risk, and automatically rebalanced portfolios based on stock price movements are other examples of streaming data. Another example of continual data is a real-estate website tracking a subset of data from consumers' mobile devices making real-time property recommendations of properties to visit based on their geo-location. A media publisher streaming billions of clickstream records from its online properties, aggregating it and enriching the data with demographic information about users to optimize content its website is another example of streaming data.

Streaming data differs from batch data analysis. Batch processing can be used to compute arbitrary queries over different sets of data. It usually computes results that are derived from all the data it encompasses and enables deep analysis of big data sets at the expense of real time results.

As streaming data is continuous, a portion of the data must be selected for examination. The portion, which is normally based on time but may be based on other parameters, is selected in consideration of the need for timely results and the time by which processing can occur. For example, the volume of data can used as a selection criteria rather than a particular period of time. A larger sampling may provide additional information and more reliable results but at the expense of delayed delivery of results. A shorter interval may be processed quickly yet yield results that are inconclusive.

The present invention selects an interval of data flowing from a continual source of data based on accelerated processing by a GPU. As compared to processing techniques of the prior art, the present invention maximizes data analysis while providing timely results.

The selected interval of data is converted into an image. In one embodiment of the present invention the data is converted into a rectilinear grid represent a two-dimensional image. The present invention is not, however, limited to rectilinear grids nor two dimensions. Indeed, an n-dimensional image or space can be created and examined in the same manner as with the rectilinear grid-based image described below. The invention accepts an n-dimensional array of binned intensity values and forms an array of the values. For one axis of the array, the invention determines n−1 dimensional clusters with a given (predetermined) distance threshold for each sub-array. The clusters are assembled from adjacent clusters with a predetermined distance threshold and minimum and maximum values for all dimensions are determined within each cluster.

As described above the present invention uses image segmentation to identify a signal or significant cluster of data. Image segmentation is the process of partitioning a digital image into multiple segments (sets of pixels, also known as image objects). The goal of segmentation is to simplify and/or change the representation of an image into something that is more meaningful and easier to analyze. Image segmentation is typically used to locate objects and boundaries (lines, curves, etc.) in images. More precisely, image segmentation is the process of assigning a label to every pixel in an image such that pixels with the same label share certain characteristics.

The result of image segmentation is a set of segments that collectively cover the entire image, or a set of contours extracted from the image. Each of the pixels in a region are similar with respect to some characteristic or computed property, such as color, intensity, or texture. Adjacent regions are significantly different with respect to the same characteristic(s). Region boundaries and edges are closely related, since there is often a sharp adjustment in intensity at the region boundaries. Edge detection techniques have therefore been used as the base of another segmentation technique.

As an example, one embodiment of the present invention applies an image segmentation approach to frequency-agile signal detection. With additional reference to FIG. 1, a system 101 for signal detection by way of GPU accelerated image segmentation begins with signal/data collection. Sensors or similar collection means 110 collect data 115 that may otherwise resemble noise. Indeed, some frequency agile systems are designed to resemble noise thereby making detection challenging. As mentioned above frequency agile systems can "hop" to another frequency at a rate exceeding 80000 hops per second.

Figure 1:
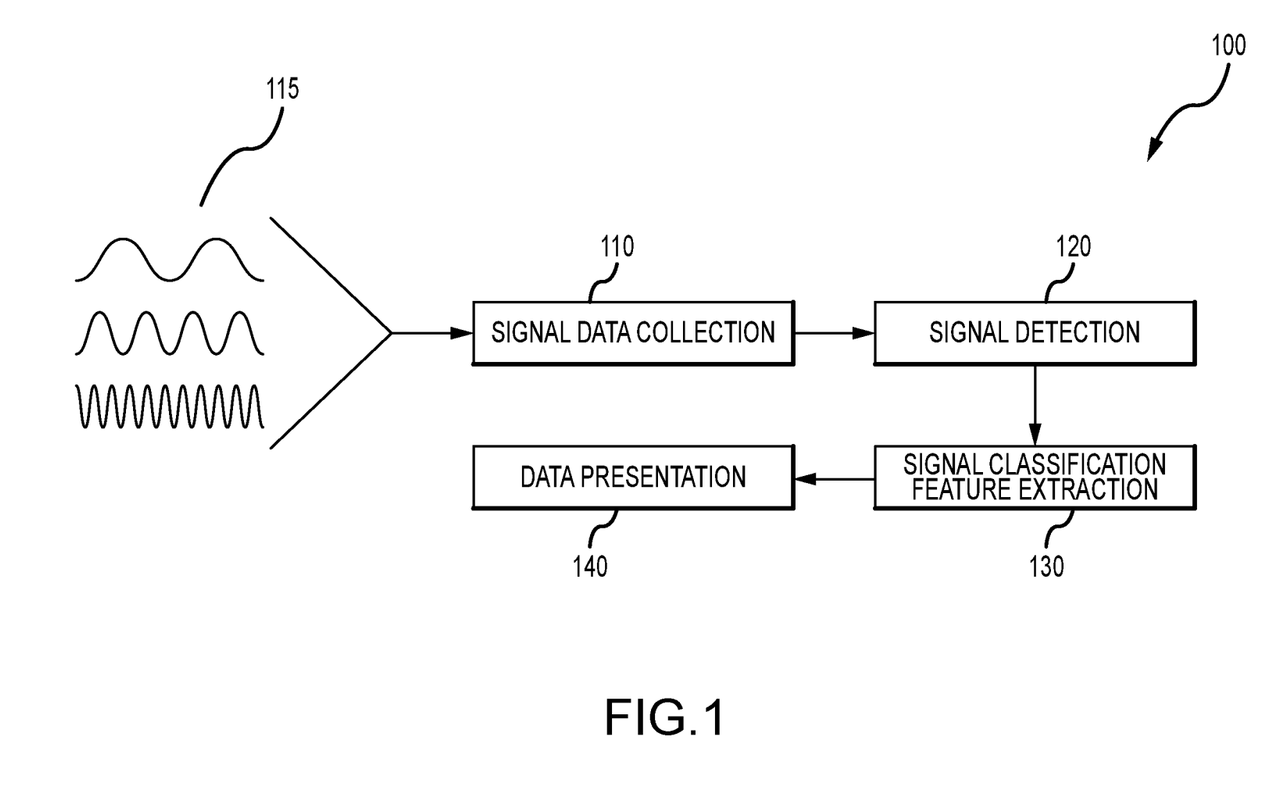
FIG. 1 shows a high-level block diagram of a system for GPU accelerated image segmentation according to one embodiment of the present invention.

Upon collection of data, signal detection 120 begins. The focus of this invention is this segment of the overall signal analysis process. One of reasonable skill in the art will recognize that signal detection leads to signal classification and feature extraction 130 producing useful and actionable results. These results are thereafter conveyed 140 to a user or other system for further steps.

Data collected by sensors arrives at the present invention in the form of a data stream or as a continual source of data. A predetermined interval of data provides a snapshot of the data stream for processing. Assume for the present example a one second segment of the data stream is isolated. In one embodiment of the present invention the radio frequency data contained within the one second segment of data includes numerous frequencies, many of which would be considered noise. In radio reception, radio noise is unwanted random radio frequency electrical signals, fluctuating voltages, always present in a radio receiver in addition to the desired radio signal.

Figure 2:
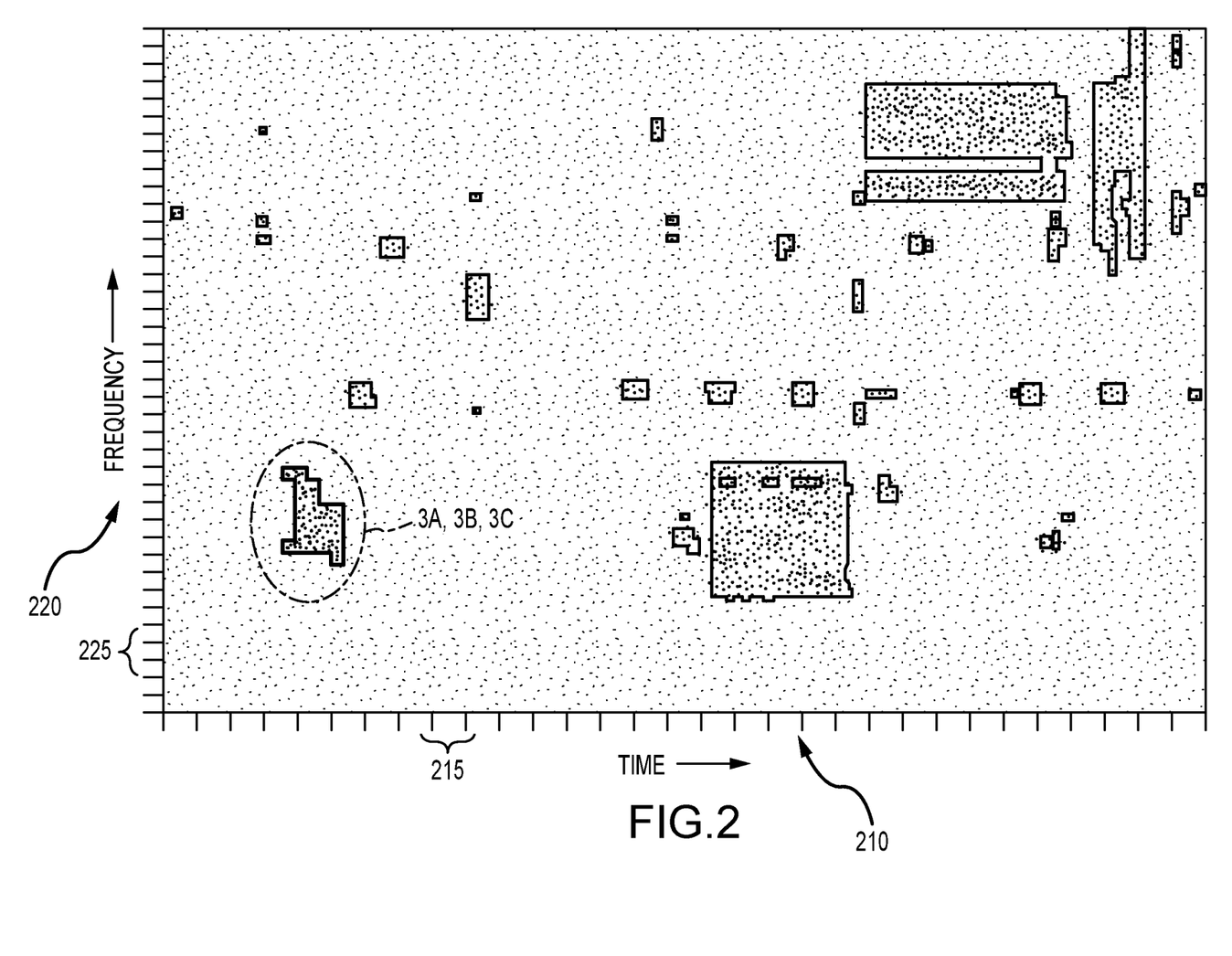
FIG. 2 shows a rectilinear grid-based image of a select interval of a collected radio frequency data, according to one embodiment of the present invention.

The present invention converts the frequency data into an image using, in one embodiment, Fast Fourier Transforms. Fourier analysis converts a signal from its original domain (often time or space) to a representation in the frequency domain and vice versa. FIG. 2 shows an image of a select time interval of frequency data. The image is a rectilinear grid having a first axis 210, time, and a second axis 220, frequency. Each of the axis are divided into axis units. In this instance the first axis, time, is dividing up into equal units 215 of 0.01 second, time units. Similarly, the second axis is divided into equal second axis units 225 of frequency. The result is a grid of squares or pixels representing a certain power level at a point of time and certain frequency. Each power level in each pixel varies based on collected data.

Figure 3A:
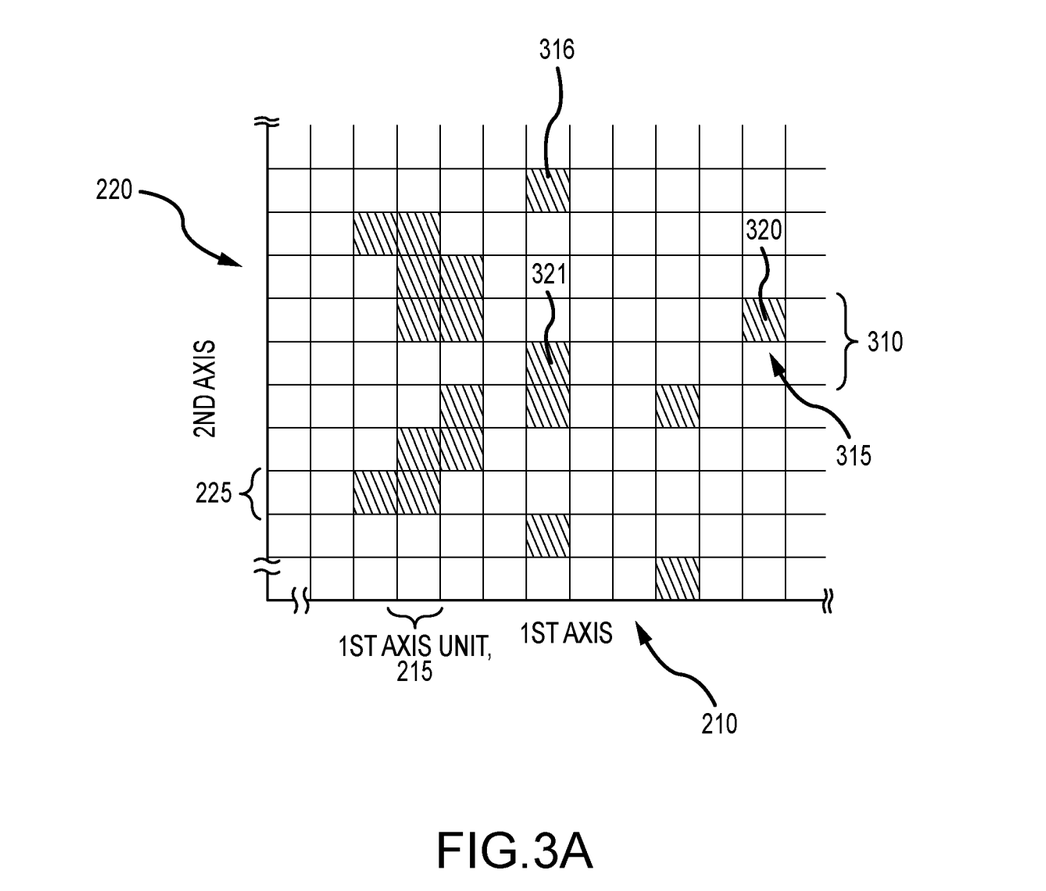
FIGS. 3A-3C present an expanded view pixels in the rectilinear image of collected radio frequency data illustrating the process by which GPU accelerated image segmentation according to the present invention, detects a signal.
Figure 3B:
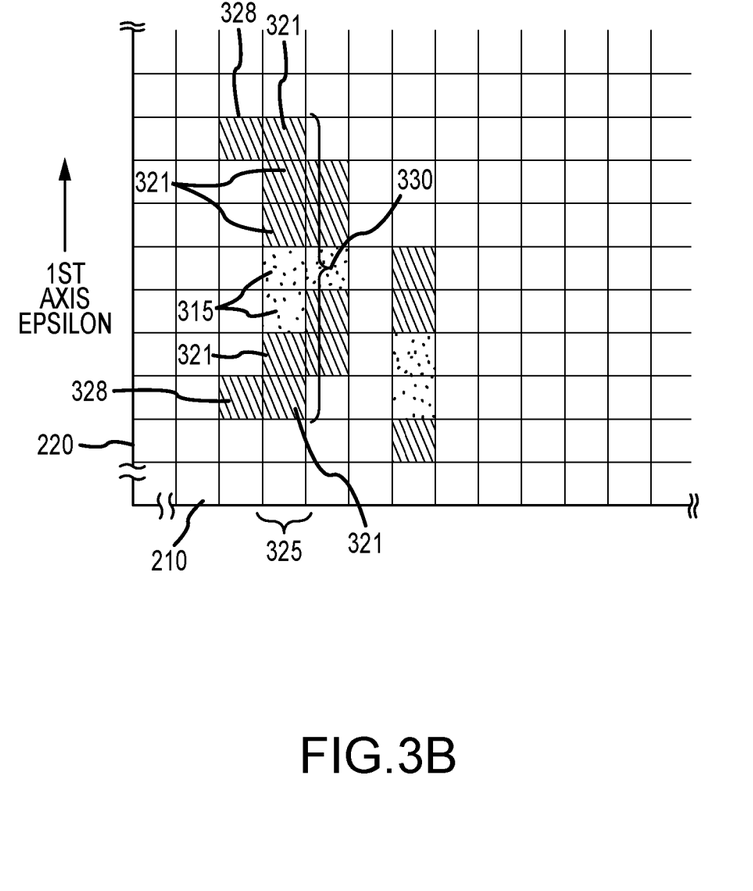
Figure 3C:
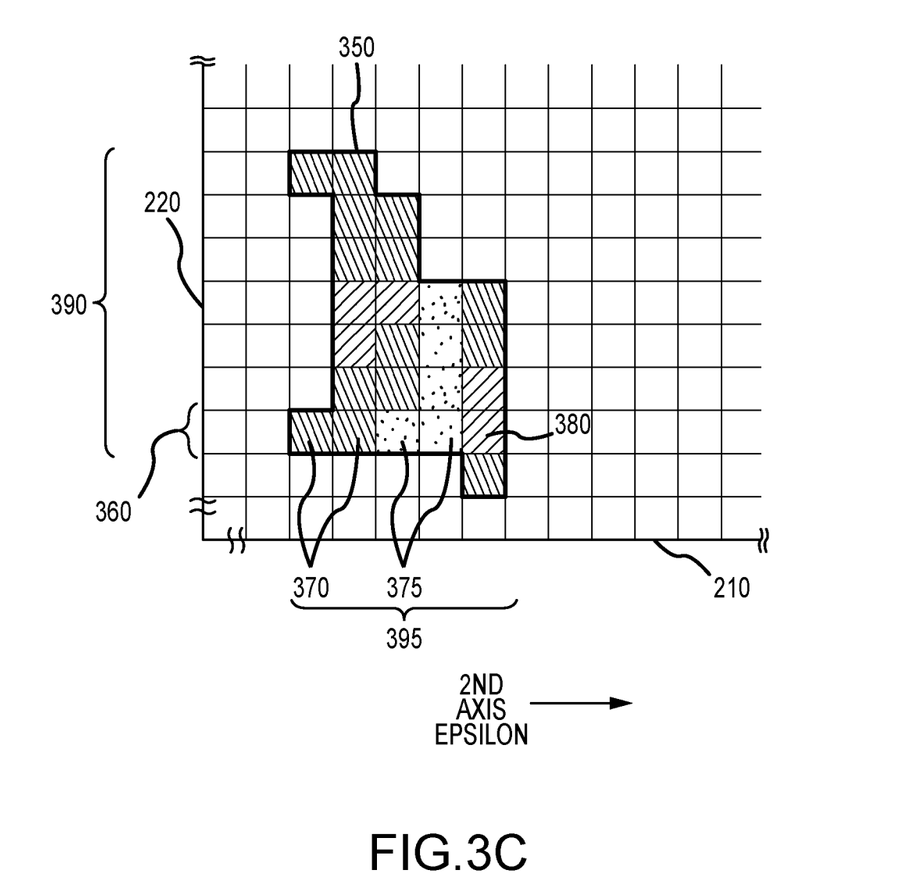

An expanded portion of the image shown in FIG. 2 is presented in FIG. 3A-3C. FIG. 3A is a plurality of pixels with the horizontal axis, the first axis 210, representing equal increments 215 of time, and the vertical axis, the second axis 220, representing equal increments 225 of frequency. The varying degrees of darkness or shading 310 of each pixel in FIG. 3A show, in this example, varying degrees of power. A blank pixel 315 represents that no appreciable power was detected at that point of time and that particular frequency. Similarly, a darker shaded pixel 320 is representative that a higher degree of power was observed at that particular period of time and frequency.

According to one embodiment of the present invention, within each axis unit 215, 225 of one axis 210, 220 of the image is examined to determine if the pixel exceeds a predetermine threshold. In this instance each pixel in a single interval of time 215 is examined to determine if it exceeds a predetermined threshold of power. Those that meet that threshold are identified as a positive return pixel 321. Those that fail to meet that threshold 316 are ignored as noise. The invention could also examine each pixel in a particular unit of frequency 225 to achieve the same result. And in other instances, the pixels themselves may represent values other than power.

The invention continues to examine the pixels in each axis unit to determine which positive return pixels are adjacent to other positive return pixels. FIG. 3B shows these pixels within the image which have been identified as positive return pixels. As signal power levels may vary and data collection can be imprecise, adjacency of positive return pixels within an axis unit is based on an epsilon value. An epsilon value is a predetermined, or user set value, of non-positive return pixels that may intercede between two positive return pixels. For example, if the epsilon value is one then a non-positive return pixel resting between two positive return pixels would be viewed by the present invention as three positive return pixels.

Assuming in this instance that the first axis epsilon value in FIG. 2B is two (2). Thus, looking at a specific instance of time 325, any positive return pixels 321 within two or fewer non-positive return pixels 315 would be grouped together as a series of positive return pixels 321. In the first column of the time unit the invention has identified two positive return pixels 328, but they are separated by 5 non-positive pixels. Therefore, these two pixels would not be grouped together.

The next axis unit also includes positive return pixels 321. In this instance the first two positive return pixels encountered as traversing the axis unit 325 from the bottom to the top are adjacent. As there are no non-positive return pixels 315 between the positive return pixels 321 the invention groups these two pixels together. Continuing up the axis unit the next two pixels are non-positive 315 followed by three positive return pixel 321. Using a first axis epsilon value, in this example two, there are two or fewer non-positive return pixels 315 between two positive return pixels 321, the present invention, according to one embodiment, groups the pixels together. Thus, an examination of this axis unit 325 identifies a grouping of seven positive return pixels 330.

The present invention, in a like manner, examines each axis unit 215 to determine which pixels are positive return pixels 321 and which are grouped based on a predetermined epsilon value. Significantly, the present invention uses the parallel computing offered by graphic processing to reduce the computational burden. By using arguably less capable resources of a GPU but using them in parallel the present invention achieves superior results and the ability to detect, classify and identify, in this case, frequency-agile signals. Accordingly, the analysis of each axis unit is conducted in parallel or concurrently.

With the analysis of each first axis unit complete, the present invention thereafter iteratively merges the results based on a second axis epsilon value. Collecting line segments, or axis units, lends itself in the same GPU Occupancy as moving average denoising by scheduling one thread per pixel column. Gathering line segments based on an axis unit, sets aside a list of "left edges" of clusters which for each of these left edges the invention allocates a thread to iteratively build rightward. This scales according to how "busy" is the spectrum.

As with the first axis epsilon value, the present invention examines whether adjacent pixels in the second axis are non-positive return pixels or positive return pixels. During this phase of the invention the analysis merges adjacent first axis unit columns by examining pixels for adjacency along the second axis units.

Turing to FIG. 3C and using a second axis epsilon value of two (2), the merger of first axis unit groupings results in a block 350 or assembly of positive return pixels. For example, in the third row 360 of the grid as shown in FIG. 3C two positive return pixels 370 are followed by two non-positive return pixels 375 followed by a positive return pixel 380. Recall that the last "positive return pixel 380" was based on the prior analysis of the first axis unit and the first epsilon value and is not originally a positive return pixel. Nonetheless the invention treats the now designated grouping as positive return pixels making it qualify as a grouping when viewed from the second axis unit epsilon value.

Iteratively merging each first axis unit 215 and applying the second axis epsilon value forms an assembly of groups 350 designating a signal. The present invention thereafter reports a signal detection 350 spanning a defined frequency range 390 over a certain period of time 395. The present invention, in another embodiment, examines the groupings, both in the first axis and the second axis (in this example, over time and frequency) to determine if a minimum signal value has been reached. Continuing with the example in FIG. 3, the groupings of positive return pixels based on the first axis epsilon must also meet a minimum signal bandwidth or first axis gamma before that group of positive return pixels is designated as a signal. Similarly, the merging of the first axis units based on the second axis epsilon must also meet a minimum signal time or second axis gamma to obtain a signal designation. With both epsilon and gamma values considered a signal is identified. This and other signal detections and signal characteristics in the image can be further analyzed to determine if the hoping pattern is random or whether the duration of each hop in frequency or duration is consistent.

In the example presented above, to observe the frequency spectrum in high enough resolution and to capture rapidly hopping signals one version of the invention maximizes the current capability of a software defined radio to produce an image spanning 100 Mhz between 2 tuners at a sample rate of 50 MS/s. When converting this to the spectrum using 1024 bin FFTs, the observed "image" provides a very high-resolution of 1024×49480 (over 50 million pixels). The highly paralleled solution of the present invention breaks the analysis of this image into a viable solution.

In another embodiment of the present invention, the intersections of line segments in the image are identified rather than measuring distance between the points, as is done in the prior art. A line segment can be viewed as a frequency over a period of time or a defined increment of time over a range of frequencies. Instead of a pixel by pixel analysis this version of the present invention would find vertical and horizontal line segment intersections and rather than measuring distance between the pixels as is done in techniques known in the art, the present invention identifies intersections or crossover points identifying a signal.

The use of graphics cards/GPU provides an extremely parallel and scalable solution. Utilizing, for example, a CuPy Python library to convert a large range of CPU Numpy code to GPU functions drastically speeds up pre-processing with only the small price of initial overhead of transferring IQ to the GPU.

For preprocessing parallelism, spectrogram generation code directly mapped to CuPy functions provides a 100% increase in execution speed compared to its CPU counterpart. Thresholding is also highly parallel where development machines making use of a graphics card are able to split this job up over, in one instance, 2048 threads completing the task in less than a 10th of a second.

Moving average denoising over the frequency domain is split up over all GPU threads, bringing execution time, in one example, to about 4 thousandths of a second. It is important to note that all pre-processing operations mentioned above scale linearly to input size with no regards of contents of the spectrum. The current embodiment scales according to the contents of the spectrum.

Post processing of each detection is also highly scalable allowing the invention to allocate 1 thread per detection to collect final details about that detection, needed for various DSP/Classification purposes.

Figure 4:
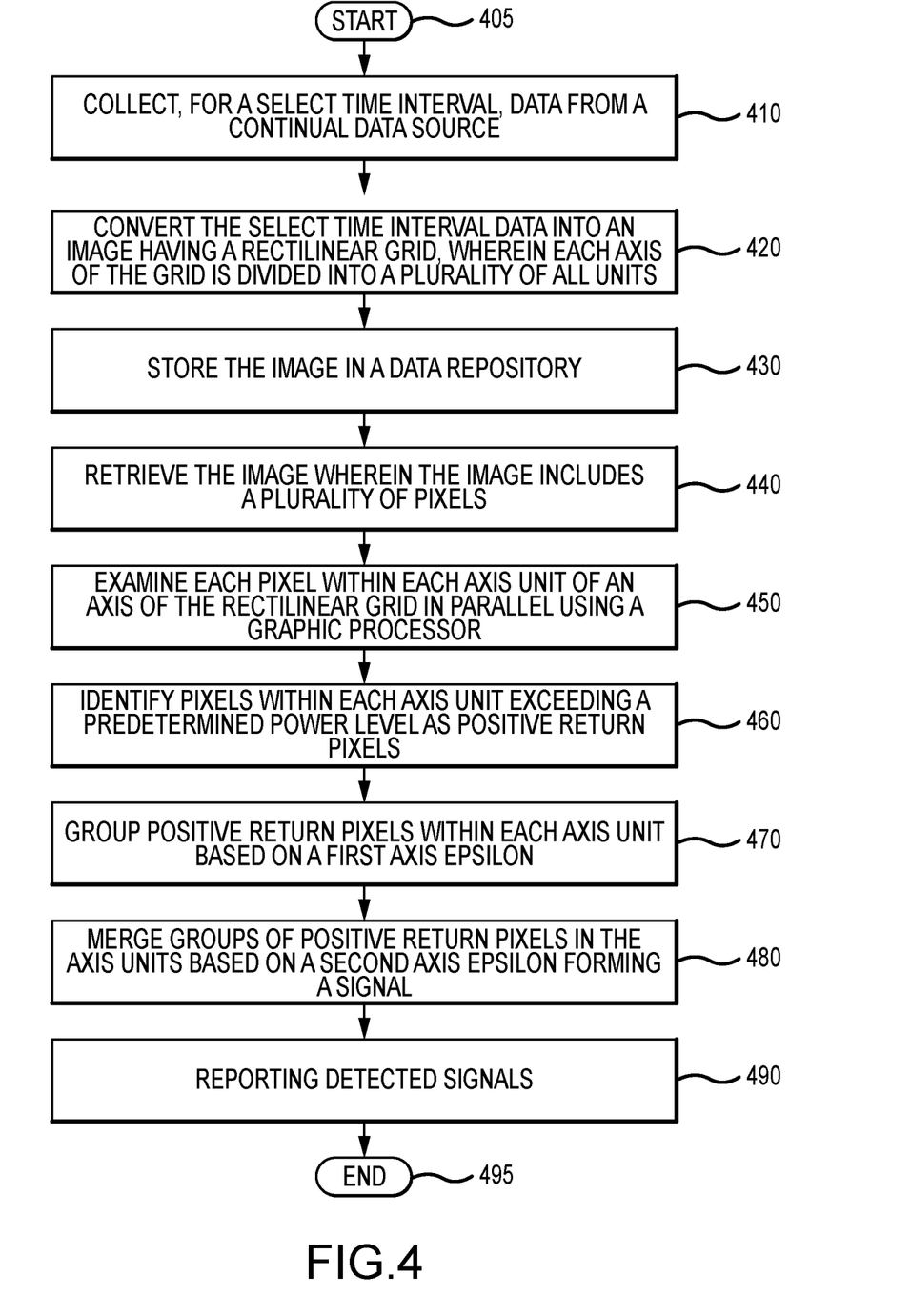
FIG. 4 is a flowchart of one embodiment for a method of GPU accelerated image segmentation according to the present invention.

FIG. 4 presents a methodology flowchart for GPU accelerated image segmentation according to one embodiment of the present invention. The process begins 405 with the collection 410, for a select time period, data from a continual data source. Using Fast Fourier Transforms the data is converted 420 into an n-dimensional image. In one instance the image is a rectilinear grid having a first and second axis and wherein each axis is divided into a plurality of units. For example, one axis can be time evenly depicting increments of time while the other axis presents increments of frequency.

The image is stored 430 for later analysis and historical relevance before it is retrieved 440 for further processing. The opposing axis units of the image form a grid of pixels. Within each axis unit of one of an axis of the grid, each pixel is examined 450 to identify whether the pixel exceeds a predetermined threshold or power level. Those pixels that exceed the threshold are binarily identified 460 as a positive return pixel. Each axis unit, which can be viewed as a column or row in the grid, is examined in parallel using a GPU making the analysis computationally efficient.

Once each pixel in a particular axis unit has been examined those positive return pixels adjacent to other positive return pixels, or those within a certain first axis epsilon value of non-positive return pixels, are grouped 470 together. Adjacent groups of positive return pixels are then merged 480 together based on a second axis epsilon value. Upon iteratively merging all of the axis units the assembled groups define detected signals within the select time interval represented by the image. Post detection processing of signals can be thereafter commenced upon the reporting 490 of the detection results, ending 495 the process.

The parallel processing capability of a graphic processor unit enables the present invention to examine a wide spectrum of data quickly and with computational efficiency. While the present invention has been described above with regard to detecting frequencies associated with a frequency agile radio other sources of streaming data can be similarly examined, and the invention may be embodied in other specific forms without departing from the spirit or essential characteristics thereof. Likewise, the particular naming of the functions, features, attributes, methodologies, and other aspects are not mandatory or significant.

In a preferred embodiment, the present invention can be implemented in software. Software programming code which embodies the present invention is typically accessed by a microprocessor from long-term, persistent storage media of some type, such as a flash drive or hard drive. The software programming code may be embodied on any of a variety of known media for use with a data processing system, such as a diskette, hard drive, CD-ROM, or the like. The code may be distributed on such media, or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

Figure 5:
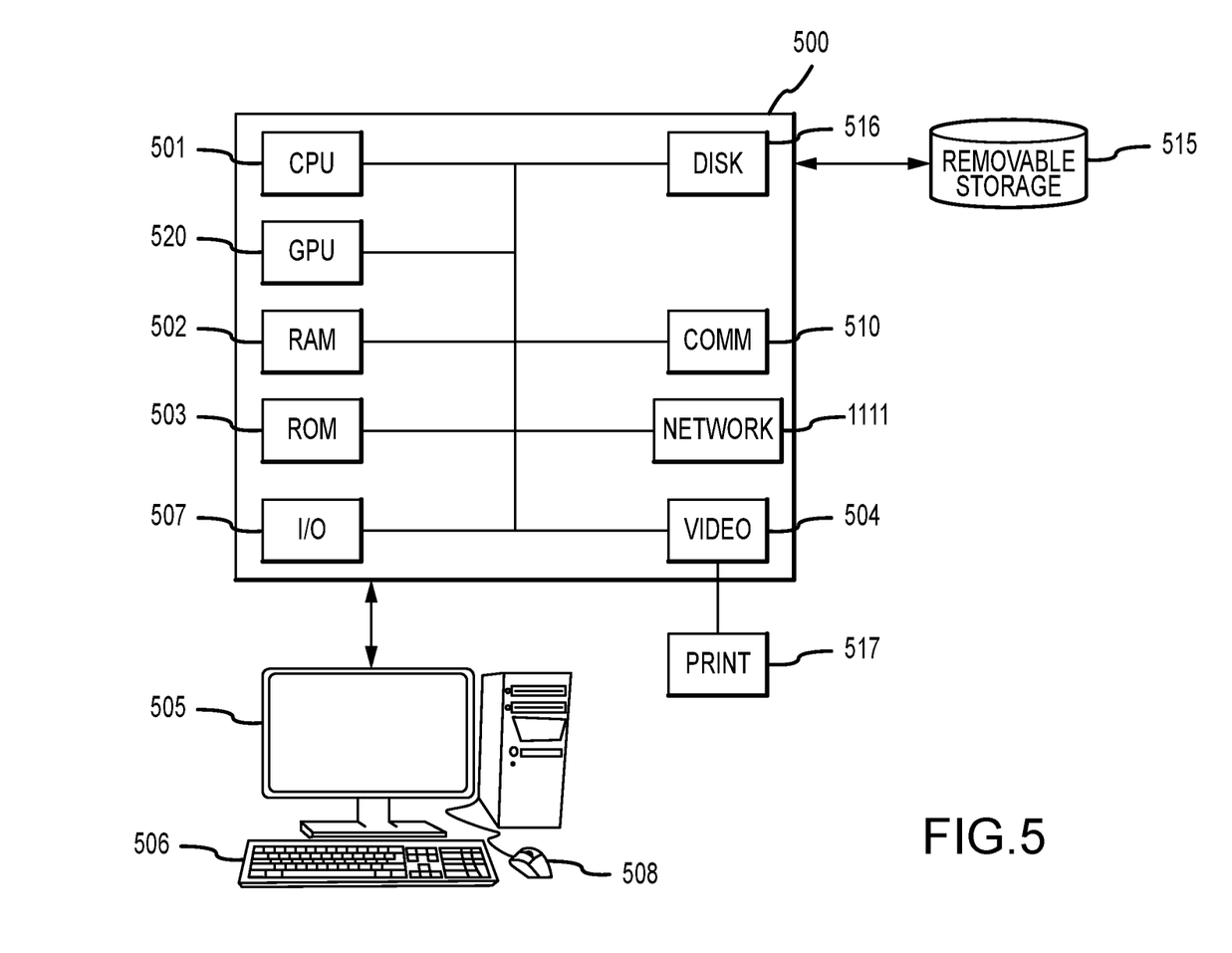
FIG. 5 is a high-level depiction of a computer system for GPU accelerated image segmentation according to one embodiment of the present invention.

One of reasonable skill will recognize that portions of the present invention may be implemented on a conventional or general-purpose computer system, such as a personal computer (PC), a laptop computer, a notebook computer, a handheld or pocket computer, and/or a server computer. FIG. 5 is a very general block diagram of a computer system in which software-implemented processes of the present invention may be embodied. As shown, system 500 comprises a central processing unit(s) (CPU) or processor(s) 501 coupled to a random-access memory (RAM) 502, a graphics processor unit(s) (GPU) 520, a read-only memory (ROM) 503, a keyboard or user interface 506, a display or video adapter 504 connected to a display device 505, a removable (mass) storage device 515 (e.g., floppy disk, CD-ROM, CD-R, CD-RW, DVD, or the like), a fixed (mass) storage device 516 (e.g., hard disk), a communication (COMM) port(s) or interface(s) 510, and a network interface card (NIC) or controller 511 (e.g., Ethernet). Although not shown separately, a real time system clock is included with the system 500, in a conventional manner.

CPU 501 comprises a suitable processor for implementing the present invention. The CPU 501 communicates with other components of the system via a bi-directional system bus 520 (including any necessary input/output (I/O) controller 507 circuitry and other "glue" logic). The bus, which includes address lines for addressing system memory, provides data transfer between and among the various components. Random-access memory 502 serves as the working memory for the CPU 501. The read-only memory (ROM) 503 contains the basic input/output system code (BIOS)—a set of low-level routines in the ROM that application programs and the operating systems can use to interact with the hardware, including reading characters from the keyboard, outputting characters to printers, and so forth.

Mass storage devices 515, 516 provide persistent storage on fixed and removable media, such as magnetic, optical, or magnetic-optical storage systems, flash memory, or any other available mass storage technology. The mass storage may be shared on a network, or it may be a dedicated mass storage. As shown in FIG. 5, fixed storage 516 stores a body of program and data for directing operation of the computer system, including an operating system, user application programs, driver and other support files, as well as other data files of all sorts. Typically, the fixed storage 516 serves as the main hard disk for the system.

In basic operation, program logic (including that which implements methodology of the present invention described below) is loaded from the removable storage 515 or fixed storage 516 into the main (RAM) memory 502, for execution by the CPU 501. During operation of the program logic, the system 500 accepts user input from a keyboard and pointing device 506, as well as speech-based input from a voice recognition system (not shown). The user interface 506 permits selection of application programs, entry of keyboard-based input or data, and selection and manipulation of individual data objects displayed on the screen or display device 505. Likewise, the pointing device 508, such as a mouse, track ball, pen device, or the like, permits selection and manipulation of objects on the display device. In this manner, these input devices support manual user input for any process running on the system.

The computer system 500 displays text and/or graphic images and other data on the display device 505. The video adapter 504, which is interposed between the display 505 and the system's bus, drives the display device 505. The video adapter 504, which includes video memory accessible to the CPU 501, provides circuitry that converts pixel data stored in the video memory to a raster signal suitable for use by a cathode ray tube (CRT) raster or liquid crystal display (LCD) monitor. A hard copy of the displayed information, or other information within the system 500, may be obtained from the printer 517, or other output device.

The system itself communicates with other devices (e.g., other computers) via the network interface card (NIC) 511 connected to a network (e.g., Ethernet network, Bluetooth wireless network, or the like). The system 500 may also communicate with local occasionally connected devices (e.g., serial cable-linked devices) via the communication (COMM) interface 510, which may include a RS-232 serial port, a Universal Serial Bus (USB) interface, or the like. Devices that will be commonly connected locally to the interface 510 include laptop computers, handheld organizers, digital cameras, and the like.

While there have been described above the principles of the present invention in conjunction with GPU accelerated image segmentation, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

The invention claimed is:

1. A method for accelerated image segmentation, implemented by a computer wherein the computer includes a graphic processor unit configured to execute instructions to perform the method and wherein the computer is communicatively coupled to one more continual sources of data, the method comprising:
   retrieving an image of data including a plurality of pixels wherein the pixels are arranged in a rectilinear grid having a first axis and a second axis and wherein each axis of the grid is associated with a plurality of axis units;
   examining each pixel within each axis unit along one axis wherein responsive to a pixel power level exceeding a threshold, identifying the pixel as a positive return pixel, and wherein each axis unit is examined in parallel by the graphic processor unit; and
   grouping a block of positive return pixels wherein each block of positive return pixels is designated as a signal.

2. The method for accelerated image segmentation according to claim 1, wherein grouping of positive return pixels in an axis unit is based on a first axis epsilon value designating a maximum number of non-positive return adjacent pixels.

3. The method for accelerated image segmentation according to claim 1, wherein grouping includes iteratively merging each axis unit with its adjacent unit and wherein grouping of positive return pixels of each merged axis unit is based on a second axis epsilon value designating a maximum number of non-positive return adjacent pixels.

4. The method for accelerated image segmentation according to claim 1, further comprising moving average denoising within each axis unit using different graphic processor unit threads.

5. The method for accelerated image segmentation according to claim 1, wherein each block of positive return pixels is defined as a grouping of adjacent pixels in each axis of the rectilinear grid.

6. The method for accelerated image segmentation according to claim 1, further comprising selecting a time interval of data collected from the one or more continual sources of data and converting the time interval of data to the image using Fast Fourier Transforms.

7. The method for accelerated image segmentation according to claim 1, wherein the one or more continual sources of data include a stream of radio frequency data.

8. A system for accelerated image segmentation, comprising:
- a continual source of data;
- a computer communicatively coupled to the continual source of data, the computer having a graphic processor unit;
- a non-transitory storage medium configured to store a series of instructions embodied as software wherein the graphic processor unit is configured to execute the series of instructions to:
  - retrieve an image of data including a plurality of pixels wherein the pixels are arranged in a rectilinear grid having a first axis and a second axis and wherein each axis of the grid is associated with a plurality of axis units;
  - examine each pixel within each axis unit along one axis wherein responsive to a pixel power level exceeding a threshold, identifying the pixel as a positive return pixel, and wherein each axis unit is examined in parallel by the graphic processor unit; and
  - group a block of positive return pixels wherein the block of positive return pixels is designated as a signal.

9. The system for accelerated image segmentation according to claim 8, wherein the instructions to group include instructions to iteratively merge each axis unit with its adjacent unit and wherein grouping of positive return pixels of each merged axis unit is based on a second axis epsilon value designating a maximum number of non-positive return adjacent pixels.

10. The system for accelerated image segmentation according to claim 8, further comprising instructions to use different graphic processor unit threads to denoise each axis unit using moving averages.

11. The system for accelerated image segmentation according to claim 8, wherein grouping of positive return pixels in an axis unit is based on a first axis epsilon value designating a maximum number of non-positive return adjacent pixels.

12. The system for accelerated image segmentation according to claim 8, wherein each block of positive return pixels is defined as a grouping of adjacent pixels in each axis of the rectilinear grid.

13. The system for accelerated image segmentation according to claim 8, further comprising instructions to select a time interval of data collected from the one or more continual sources of data and converting the time interval of data to the image using Fast Fourier Transforms.

14. The system for accelerated image segmentation according to claim 8, wherein the one or more continual sources of data include a stream of radio frequency data.

15. A non-transitory computer-readable storage medium tangibly embodying a program of instructions executable by a machine having a graphic processor unit wherein said program of instruction comprises a plurality of program codes for accelerated line segmentation, said program of instruction comprising:
- program code for retrieving an image of data including a plurality of pixels wherein the pixels are arranged in a rectilinear grid having a first axis and a second axis and wherein each axis of the grid is associated with a plurality of axis units;
- program code for examining each pixel within each axis unit along one axis wherein responsive to a pixel power level exceeding a threshold, identifying the pixel as a positive return pixel, and wherein each axis unit is examined in parallel by the graphic processor unit; and
- program code for grouping a block of positive return pixels wherein the block of positive return pixels is designated as a signal.

16. The program of instruction for accelerated line segmentation embodied in the non-transitory computer-readable storage medium of claim 15, wherein the program code for grouping includes program code for iteratively merging each axis unit with its adjacent unit and wherein grouping of positive return pixels of each merged axis unit is based on a second axis epsilon value designating a maximum number of non-positive return adjacent pixels.

17. The program of instruction for accelerated line segmentation embodied in the non-transitory computer-readable storage medium of claim 15, further comprising program code for moving average denoising within each axis unit using different graphic processor unit threads.

18. The program of instruction for accelerated line segmentation embodied in the non-transitory computer-readable storage medium of claim 15, wherein grouping of positive return pixels in an axis unit is based on a first axis epsilon value designating a maximum number of non-positive return adjacent pixels.

19. The program of instruction for accelerated line segmentation embodied in the non-transitory computer-readable storage medium of claim 15, wherein each block of positive return pixels is defined as a grouping of adjacent pixels in each axis of the rectilinear grid.

20. The program of instruction for accelerated line segmentation embodied in the non-transitory computer-readable storage medium of claim 15, further comprising program code for selecting a time interval of data collected from the one or more continual sources of data and converting the time interval of data to the image using Fast Fourier Transforms.

21. The program of instruction for accelerated line segmentation embodied in the non-transitory computer-readable storage medium of claim 15, wherein the one or more continual sources of data include a stream of radio frequency data.

\* \* \* \* \*